United States Patent [19]

Genta

[11] 3,923,454

[45] Dec. 2, 1975

[54] POLYESTER AND PLASTIC DYES

[75] Inventor: Guido R. Genta, Snyder, N.Y.

[73] Assignee: American Aniline Products, Inc., Paterson, N.J.

[22] Filed: May 7, 1974

[21] Appl. No.: 467,721

Related U.S. Application Data

[62] Division of Ser. No. 299,398, Oct. 20, 1972, Pat. No. 3,840,567.

[52] U.S. Cl. .................. 8/39; 260/37 EP; 260/37 P; 260/40 R; 260/41 C; 260/41.5 R; 260/373; 8/179
[51] Int. Cl.$^2$ ......................... C09B 1/50; D06P 1/20
[58] Field of Search ................... 8/39, 179; 260/373

[56] References Cited
UNITED STATES PATENTS
3,840,567  10/1974  Genta ................................. 260/373

FOREIGN PATENTS OR APPLICATIONS
1,283,417  11/1968  Germany

*Primary Examiner*—Joseph L. Schofer
*Assistant Examiner*—A. L. Clingman
*Attorney, Agent, or Firm*—Armstrong, Nikaido & Wegner

[57] ABSTRACT

Anthraquinones are produced through the treatment of an intermediate anthraquinone with benzenesulfonyl chloride in the presence of aluminum chloride to produce compounds suitable for the dyeing of polyester materials in shades of excellent fastness properties, and for the coloration of rigid plastic materials.

6 Claims, No Drawings

POLYESTER AND PLASTIC DYES

This is a division of application Ser. No. 299,398, filed Oct. 20, 1972, now U.S. Pat. No. 3,840,567.

BACKGROUND OF THE INVENTION

Anthraquinones have long been known in the dye art. In early years, the water-insoluble anthraquinones were used chiefly as intermediates for the production of sulfoanthraquinones which found wide application as dyes for natural polyamide fibers. In recent years, various anthraquinones have been proposed for synthetic fibers, including the cellulose acetates and, most recently, the polyester family, particularly polyethylene terephthalate. However, many of the compounds which heretofore had been found satisfactory for the dyeing of synthetic fibers, including polyesters, are no longer satisfactory due to the increased requirements of excellent fastness which have been brought about through the modern dyeing treatments.

I have now discovered a new class of dyes of the anthraquinone series which produce dyeings of excellent fastness to light and sublimation. The anthraquinones of the invention are also pigments for plastic substrate.

SUMMARY OF THE INVENTION

In accordance with the invention there are provided mixtures of a substituted aminoanthraquinone containing a phenylsulfonyl group. The aminoanthraquinone is a mixture of compounds containing halogen atoms, preferably chlorine or bromine, in an average amount of 0.001 to 4.0 halogen atoms per molecule of the aminoanthraquinone. The phenylsulfonyl and at least a portion of the halogen atoms are introduced in a unitary process through a Friedel-Crafts reaction.

DETAILED DESCRIPTION

In accordance with the invention, there are provided halogenated mixtures of an aminoanthraquinone of the formula

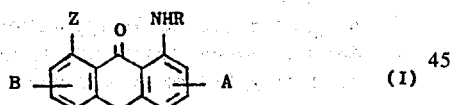

(I)

wherein

R is hydrogen or lower alkyl;

two of X, Y and Z are independently hydroxy, amino or lower alkylamino; and the other of X, Y and Z is independently hydrogen, hydroxy, amino, nitro, or lower alkylamino;

one of A and B is an arylsulfonyl group of the formula

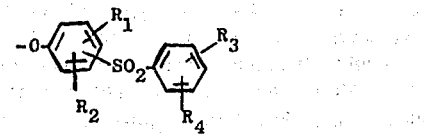

and the other of A and B is hydrogen,

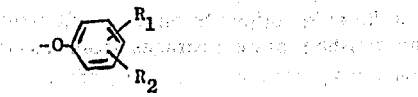

or

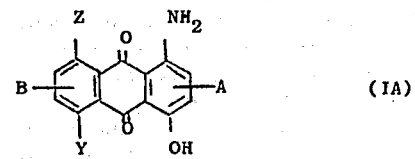

each of $R_1$ and $R_2$ is independently hydrogen, chlorine, bromine, lower alkyl or lower alkoxy; and each of $R_3$ and $R_4$ is independently hydrogen, chlorine, bromine, lower alkyl, lower alkoxy or nitro;

each aminoanthraquinone of the mixture having bonded to aromatic carbon atoms thereof an average of 0.001 to 4.0 chlorine or bromine atoms. The halogen atoms are primarily introduced into the molecule by the action of the benzenesulfonyl halide in the halogenated medium on the anthraquinone intermediate, but they may initially be present as substituents on the phenoxy group or on the phenyl ring of the benzenesulfonyl halide, as indicated by the formulas for the intermediates in the description that follows.

As a preferred aminoanthraquinone may be mentioned compounds of the formula

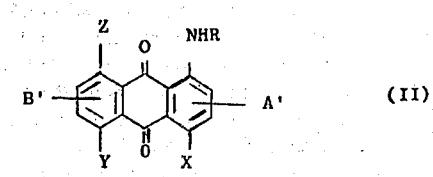

(IA)

wherein

A, B, are as defined above and one of Y and Z is hydroxy and the other is amino.

The aminoanthraquinones (I) are produced from intermediate anthraquinones of the formula:

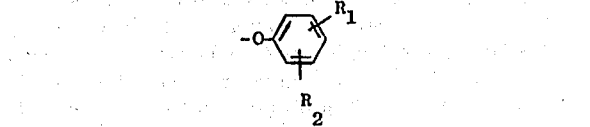

(II)

wherein one of A' and B' is group of the formula

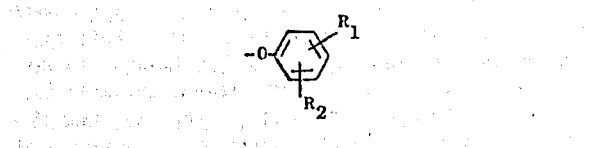

and the other of A' and B' is hydrogen or

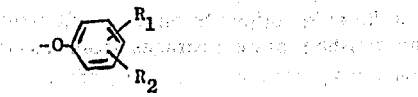

wherein R, $R_1$, $R_2$, X, Y and Z are defined above.

In order to convert an intermediate anthraquinone (II) to the halogenated mixtures of an aminoanthraquinone (I), an appropriate intermediate anthraquinone (II) is subjected to a reaction in a thin, fluid melt of anhydrous aluminum halide with a benzenesulfonyl halide of the formula

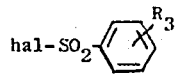
(III)

wherein hal is chlorine or bromine and $R_3$ is as defined above.

The reaction of the benzenesulfonyl halide (III) with an intermediate anthraquinone (II) introduces at least one phenylsulfonyl group into the intermediate anthraquinone, and also introduces an average of 0.001 to 4.0 halogen atoms into the intermediate anthraquinone at an aromatic carbon atom. Within the scope of the invention are the individual compounds within the mixture of the anthraquinone some of which contain no halogen atoms, whereas some contain one or two or more halogen atoms. The average halogen content may be varied depending upon the amount of benzenesulfonyl halide (III) which is utilized in the reaction. Generally, it has been found that an average of at least 0.001 halogen atoms per anthraquinone is introduced through the reaction, preferably an average of at least 0.2 halogens/anthraquinone. Although the maximum number of halogen atoms may be varied dependent upon the conditions of the reaction, particularly the amount of the benzenesulfonyl halide (III) and the reaction time and temperature, it has generally been found advantageous that the maximum be not greater than 2.0 halogens/anthraquinone.

Useful benzenesulfonyl halides (III) include benzenesulfonyl chloride or bromide and benzenesulfonyl chloride or bromide substituted with one or two of the same or different groups, including lower alkyl, lower alkoxy, chlorine, bromine or nitro groups, e.g. p-toluene sulfonyl chloride, p-chlorobenzenesulfonyl chloride, 2,4-xylene-sulfonyl chloride and the like.

The novel reaction of the invention takes place in a thin fluid melt consisting essentially of anhydrous aluminum trichloride or aluminum tribromide in admixture with a compound that gives a fluid melt at low temperature. The preparation of such melts, is well established in the dye art and is described, for example, in Genta Patent U.S. Pat. No. 2,650,928, issued Sept. 1, 1953. The fluid character of the melt can be achieved by admixing the anhydrous aluminum trihalide with either an alkali metal halide, sulfur dioxide, urea, or a tertiary base.

If an alkali metal halide is used to provide the fluid melt, it should be present in an amount of one part by weight alkali metal halide to each 5–10 parts by weight aluminum halide. Useful alkali metal halides include sodium chloride, sodium bromide, potassium chloride, potassium bromide, lithium chloride and the like.

From a practical standpoint, it is preferred to make the melt by admixing aluminum trihalide with a tertiary base which is liquid at a temperature ranging from about 80°–130°C. Useful tertiary bases include pyridine, α-picoline, quinoline, dimethylaniline, diethylaniline, triethylamine, dimethylformamide, and dimethylacetamide. The use of 0.05–0.5 part by weight of the tertiary base to one part by weight of the aluminum halide will provide a satisfactory melt.

The melt is made by charging the anhydrous aluminum halide, in a quantity sufficient to enable mixing of the reactants, e.g., 1–5 parts by weight, based on the weight of the reactants, to a suitable reactor. An appropriate quantity of the compound used to thin the melt, for example, the tertiary base, is added to the aluminum halide. The mixture is heated, conveniently to a temperature of 120°–130°C., to provide a uniform thin fluid melt.

The melt is cooled and an intermediate anthraquinone (II) is added thereto. Before or after the addition of the intermediate anthraquinone (II), the benzenesulfonyl halide (III) is added slowly, conveniently dropwise, to control the exothermicity of the reaction, and the temperature of the melt is raised to 75°–125°C., preferably to 95°–100°C. Sufficient benzenesulfonyl halide (III) is added to provide at least stoichiometric quantities of the two reactants. An excess of the benzenesulfonyl halide (III) is helpful in pushing the reaction to completion, and such excess may contribute to raising the halogen content of the final product. The reaction is allowed to continue until completion, which ordinarily requires 1 to 4 hours.

After the reaction is complete, the product is separated from the melt by drowning the reaction mass in ice water and thoroughly agitating the mixture, preferably in the presence of dilute hydrochloric acid. The mixture is boiled, e.g., by heating with live steam, diluted and the product separated by filtration. The filter cake is washed acid free, and excess water is removed conveniently by drying at 60°–120°C.

The novel dye mixtures of the invention can be made by a variation of the foregoing procedure in which a halogen, either chlorine or bromine, is introduced to the fluid melt following the addition of the benzenesulfonyl halide (III). Conveniently, this is accomplished by temporarily lowering the temperature of the melt to 60°–80°C. and slowly introducing halogen or a halogen supplying compound. Bromination is most conveniently accomplished by adding molecular bromine. Chlorine can be added as chlorine gas or as sulfuryl chloride. The melt is then raised to its original temperature, preferably, 95°–100°C., and the reaction is continued for an additional 1–3 hours. The reaction mass is then drowned in ice water and the product is recovered as described above.

To prepare the product for application to the polyester substrates noted hereabove, it must be suitably dispersed. This may be done by any of several well-known methods: milling as in a ball-mill with dispersing agents such as lignin sulfonic acid materials, for instance. The resultant aqueous dispersion can be dried, as in a spray-dryer, or preserved and used as a paste. Standardization to any desired lower strength can be done with inert colorless diluents such as inorganic salts for powders, or water for pastes. Other materials such as preservatives, foam-control agents, and melting agents may be added as desired.

Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The oil disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereabove, in equipment such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25–60 percent by weight color content (pure color).

The dye, when added to water with or without auxiliary agents, forms a near colloidal aqueous dispersion from which the aromatic polyester fiber or textile material is dyed in the conventional manner at 40°–100°C (104°–212°F) to give a colored fiber containing about 0.01–2 percent by weight dye (100% color basis).

Alternatively, dyeing may be accomplished without a carrier at temperatures of 100°–150°C under pressure. Also, the dye may be applied in patterns by conventional printing methods, if desired.

The dye is preferably applied to the aromatic polyester fiber by thermofixation methods, such as the "Thermosol" process. This process, which involves padding the cloth with the diluted dye dispersion followed by drying and heating with dried hot air or heated contact rolls, is conveniently used for dyeing polyester fibers and blends containing these fibers. Fixation temperatures of 180°–220°C (356°–428°F) are used for 30 to 90 seconds. If the fabric contains cotton or viscose rayon, apart from synthetic fibers, there is little danger of damaging cellulosic portions, but if wool is present, the temperature must be kept within 180°–200°C and the time must be reduced to 30 seconds.

In order to evaluate the effectiveness of a particular dye for a given type of fiber, the dyed fiber is examined for substantivity of the color, light fastness of the color, and resistance of the color to sublimation.

The compounds of the invention may be used for the coloration of rigid plastic substrates. The rigid plastic substrates contemplated within the scope of the invention are those plastic materials capable of being pigmented with the compounds of the invention, and will be referred to herein as "rigid plastic substrates". The rigid plastic substrates of the invention include those materials capable of being formed into a shaped article, including semi-rigid materials which may be deformed by application of pressure.

As rigid plastic substrates of the invention may be mentioned terpolymers, including acrylonitrile-styrene-butadiene, often known as ABS; acrylics, including methacrylics; polystyrene, both foamed and rubber modified polysulfones; cellulosic derivatives particularly esters such as cellulose acetate, propionate and butyrate; polyamides such as nylon; epoxy and phenolic resins; polycarbonates; and polyesters. It is understood that the rigid plastic substrates include those materials capable of being pigmented with the compounds of the invention, and therefore copolymers of the above classes of compounds, such as styrenebutadiene, are also within the scope of the invention.

Specific examples of thermoplastic resins include polyvinyl chloride, polyvinyl acetate, vinyl chloride/acetate copolymers, polyvinyl alcohol, polyvinyl acetal, ethylene/vinyl acetate, ethylene/vinyl propionate, ethylene/vinyl isobutyrate, ethylene/vinyl alcohol, ethylene/methyl acrylate, ethylene/ethyl acrylate, ethylene/ethyl methacrylate, ethylene/allyl alcohol, ethylene/allyl acetate, ethylene/allyl acetone, ethylene/allyl benzene, ethylene/allyl ether, ethylene/acrolein, polyhexamethylene adipamide, polyhexamethylene sebacamide, polycaprolactam, polymethyl methacrylate, polyacrylonitrile, polymethyl acrylate, polyethyl methacrylate, and styrene/methyl methacrylate.

As preferred rigid plastic substrates of the invention may be mentioned the polyacrylates, polystyrene and polycarbonates.

The rigid plastic substrates are colored with the compounds of the invention through pigmentation processes. The compounds are admixed with the plastic using sets of mixing rollers, mixing or milling apparatus. After the compounds and the plastic have been thoroughly mixed, the resultant colored mixture is shaped into the desired final form through procedures well known to those skilled in the art, such as pouring, calendering, extrusion spreading, or injection molding. Where the desired product is a semi-rigid material, plasticizers may advantageously be added prior to shaping into the desired final form. As plasticizers suitable for this purpose may be mentioned esters of phthalic acid. Although the plasticizer may be incorporated after the mixing of the compound of the invention with the rigid plastic substrate, it also can be incorporated into the rigid plastic material prior to mixing the pigment with the rigid plastic material. In order to vary the strength of the finished product or vary the color, it is also possible to add additional pigments or fillers in an amount sufficient to obtain the desired effect.

The amount of the compound of the invention which is used to color the rigid plastic substrate may vary widely depending upon the degree of color wished to be imparted to the final product, and depending upon whether the compound of the invention is the sole colorant or whether it is used in admixture with other plastic colorants. When the compound of the invention is used in admixture with other colorants, obviously a very minute quantity may be used to produce a complementary effect. Generally, the amount of colorant comprises less than 15%, preferably less than about 8%, by weight in relation to the rigid plastic substrate. An amount of colorant compound which has proved particularly valuable is about 0.0001% to about 1%.

EXAMPLE I

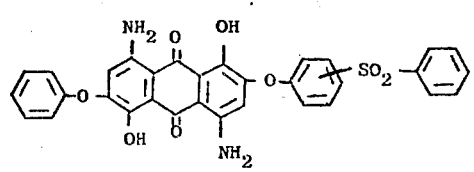

| | To a fusion pot is charged |
|---|---|
| 500 g. | aluminum chloride anhydrous. |
| 200 g. | To it is added dropwise dimethylformamide. |
| | (The temperature rises to about 100°C). The mass is cooled to 60°C. |
| | To the melt is added |
| 70 g. | benzenesulfonyl chloride followed by |
| 90 g. | 4,8-diamino-1,5-dihydroxy-2,6-diphenoxyanthraquinone. The melt is heated to 120°C and held at that temperature during one hour. After cooling to 90°C the mass is drowned into |
| 1500 ml. | water containing |
| 100 ml. | hydrochloride acid (20°Be). |
| | The diluted mass is heated to 65–70°C, after which it was |

-continued

| | |
|---|---|
| | filtered. The filter cake was washed acid free with water. Yield: 250 g. wet cake |
| | The cake is stirred into |
| 400 ml. | ethanol, denatured which is heated to 65°C. The product is isolated by filtration and washed with cold water. |

Yield: 252 g. cake containing 117 g. product as dry. For $C_{32}H_{12}ClN_2O_8S$, Theoretical Yield: 123.9 g.

S, calc 5.2%; found 5.0% Cl, calc 5.7%; found 4.8%.

The resultant anthraquinone mixture contains an average of about 0.8 chlorine atoms per molecule, the chlorine atoms being attached to aromatic carbon atoms, probably the extracyclic aryl nuclei. The mixture includes some compounds which do not contain any halogen introduced in the reaction.

EXAMPLE II

The oil color of Example I is milled to a 20% paste containing 15% "Maraspserse N-22" (a commercially available dispersant described as a sodium ligninsulfonate) based on the final weight of the paste.

Yield: 650 g. paste.

Dyeings on polyester via thermofixation yield blue dyeings. When subjected to standard tests for light fastness, washing and sublimation, the dyeing is found to have excellent properties. Fastness to sublimation is especially outstanding.

EXAMPLE III

Methyl methacrylate resin is colored with the compound of Example I as the colorant, in a ratio of 2 grams resin to 1 mg. colorant. The resin is prepared by placing 1 pound of methyl methacrylate into a Thropp mill (a 2-roller mill), which is then heated and run in order to melt and smash the resin to a molten mass. The compound of Example I is added and the entire mixture of resin and colorant is milled until the colorant is uniformly distributed in the mass as measured by eye. While still hot, 30 grams of the hot mass is cut off for use in the following procedure. The sample, containing 30 grams methyl methacrylate and 15 mg. of the compound of Example I as colorant, may be conveniently molded in a Laboratory 40 Single Acting Watson-Stillman Laboratory Press (Farrell-Birmingham Co. 50-ton press). 30 grams of methyl methacrylate mixture containing 15 mg. of the compound of Example I per pound of methyl methacrylate is placed in the cold mold, which is then closed with the Schrader Valve. The drain is opened and steam is applied to the mold. When steam comes through the drain pipe, the drain is closed. Up to 25.0 tons pressure is exerted on the chips until the mold is fully closed. This can conveniently be accomplished by observing the pressure gauge. When the gauge needle no longer decreases in pressure, then the mold is closed.

The mold is held closed at zero pressure by releasing the hydraulic pressure and maintaining the steam for 5 minutes. The mold pressure is increased to 10 tons and held for ten minutes, the steam remaining on.

The mold pressure is increased to 15 tons and the steam shut off; the drain is opened and cooling water is added for 5 minutes. Thereafter the pressure is changed to zero and the mold is opened to extract the resultant blue plastic chip.

EXAMPLE IV

When the 30 gram mixture of methyl methacrylate and the compound of Example I are replaced by 2 pounds polystyrene, 10.44 grams titanium dioxide and 227 mg. of the compound of Example I, following the procedure of Example II a fast blue coloration of the polystyrene is obtained.

EXAMPLE V

The compound of Example I may also be used as a colorant to impart a blue shade to plastics made from polycarbonates. A pigmented plastic material of polycarbonates and the compound of Example I may be prepared according to the following procedure:

A specimen is prepared by dry mixing pelletized or powdered resin with finely divided colorant until uniform distribution is achieved of the colorant in the resin material. Plasticizer may also be added, if desired. The mixture is then extruded or injected molded under suitable conditions, 454 gms Lexan 121-R (General Electric) pellets are placed in Bipel one ounce reciprocating screw injection molder. The pellets are tumbled for five minutes on the barrel tumbler. The resin is heated (front zone temperature of 550°F and rear zone temperature of 500°F) and chips are produced from the virgin resin until chips of good quality are obtained. When the desired quality of chips are obtained with the clear resin, a fresh batch of Lexan 121-R, containing the compound of Example I in an equivalent amount corresponding to Example II to produce a pigmented plastic material is fed into the injection molder, to produce blue pigmented chips having excellent fastness characteristics.

EXAMPLES VI–XVI

By following the procedure of Example I, substituting appropriate amounts of the reactants (II) and (III) for the 4,8-diamino-1,5-dihydroxy-2,6-diphenoxyanthraquinone and for the benzenesulfonyl chloride of Example I, the mixtures with the structures indicated below are produced. Polyethylene terephthalate is dyed with the mixtures according to the procedure of Example II. Methyl methacrylate, polystyrene and polycarbonate are colored with the mixtures according to the procedures of Example III–V, respectively.

| Ex. No. | Intermediate (II) or (IIA) | Halide (III) | Compound (I) (with average halogen content in parenthesis) | Shade of dyeing on polyethylene terephthalate |
|---|---|---|---|---|
| VI | 4,5-diamino-2,7-diphenoxychrysazine | benzenesulfonyl-chloride | 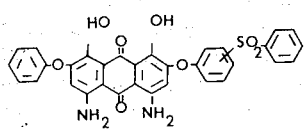<br>halogen = Cl = .7 | blue |

-continued

| Ex. No. | Intermediate (II) or (IIA) | Halide (III) | Compound (I) (with average halogen content in parenthesis) | Shade of dyeing on polyethylene terephthalate |
|---|---|---|---|---|
| VII | 4,8-diamino-2-phenoxyanthraquinone | benzenesulfonyl chloride | halogen = Cl = .9 | blue |
| VIII | 4,8-diamino-2,6-di(o-cresoxy)anthrarufin | p-toluenesulfonyl chloride | halogen = Cl = 1.2 | blue |
| IX | 4,8-diamino-2-(2,4-dichlorophenoxy)anthrarufin | p-nitrobenzenesulfonyl chloride | halogen = Cl = 2.5 | blue |
| X | 4,8-diamino-2,6-di-(p-methoxyphenoxy)anthrarufin | 2,4-dichlorobenzenesulfonyl chloride | halogen = Cl = 3.2 | blue |
| XI | 4,8-diamino-2-(p-bromophenoxy)anthrarufin | p-bromobenzenesulfonyl chloride | halogen = Br = 2, Cl = .45 | blue |
| XII | 4,8-diamino-2-(2,4-xylyloxy)anthrarufin | benzenesulfonyl chloride | halogen = Cl = .4 | blue |
| XIII | 4-amino-2-(p-cresoxy)-8-methylaminoanthrarufin | 2,4-xylenesulfonyl chloride | halogen = Cl = .9 | greenish-blue |
| XIV | 1-amino-4,5,8-trihydroxy-3-phenoxyanthraquinone | benzenesulfonyl chloride | halogen = Cl = .75 | reddish-blue |
| XV | 4,8-dimethylamino-2-(o-chlorophenoxy)anthrarufin | p-toluenesulfonyl chloride | halogen = Cl = 1.6 | greenish-blue |

3,923,454

-continued

| Ex. No. | Intermediate (II) or (IIA) | Halide (III) | Compound (I) (with average halogen content in parenthesis) | Shade of dyeing on polyethylene terephthalate |
|---|---|---|---|---|
| XVI | 4,8-diamino-2-phenoxyanthrarufin | bromobenzenesulfonyl bromide (in AlBr₃) | (structure shown) halogen = Br = 2.2 | blue |

What is claimed is:

1. A polyester fabric material dyed with a halogenated mixture of a compound of the formula:

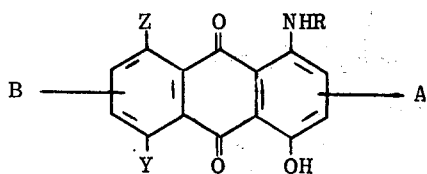

wherein
R is hydrogen or lower alkyl;
one of Y and Z is independently hydroxy, amino or lower alkylamino; and the other
of Y and Z is hydroxy;
one of A and B is an arylsulfonyl group of the formula

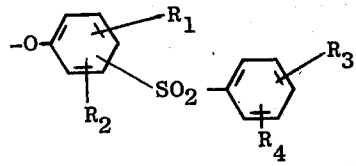

and the other of A and B is hydrogen,

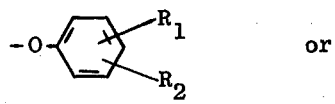 or

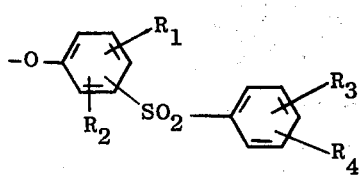

A and B each being ortho to a hydroxy group,
each of $R_1$ and $R_2$ is independently hydrogen, chlorine, bromine, lower alkyl or lower alkoxy; and
each of $R_3$ and $R_4$ is independently hydrogen, chlorine, bromine, lower alkyl, or nitro;
each aminoanthraquinone of the mixture having bonded to aromatic carbon atoms thereof between 0.001 and 4.0 chlorine or bromine atoms, wherein said chlorine or bromine is introduced at a position on said aminoanthraquinone through a Friedel Crafts reaction.

2. The polyester fabric material of claim 1 wherein an average of 0.2 to 2.0 halogen atoms are attached to said compound.

3. The polyester fabric material of claim 1 wherein said halogen is chlorine.

4. The polyester fabric material of claim 1 wherein said halogen is bromine.

5. The polyester fabric material of claim 1 wherein said compound is of the formula

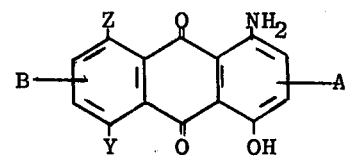

wherein A, B are as defined above and one of Y and Z is hydroxy and the other is amino.

6. A polyester fabric material dyed with a compound of the formula:

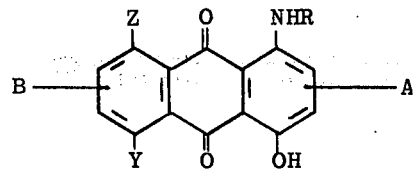

wherein
R is hydrogen or lower alkyl;
one of Y and Z is independently hydroxy, amino or lower alkylamino; and the other
of Y and Z is hydrogen;
one of A and B is an arylsulfonyl group of the formula

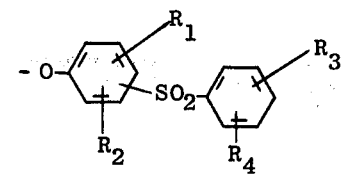

and the other of A and B is hydrogen,

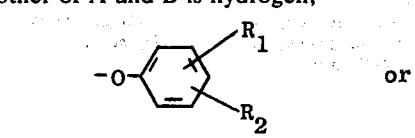 or

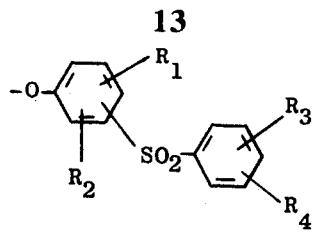
B being ortho to a hydroxy group,
each of $R_1$ and $R_2$ is independently hydrogen, chlorine, bromine, lower alkyl or lower alkoxy; and
each of $R_3$ and $R_4$ is independently hydrogen, chlorine, bromine, lower alkyl, lower alkoxy or nitro.
\* \* \* \* \*